(12) United States Patent
Taguchi

(10) Patent No.: US 10,778,871 B1
(45) Date of Patent: Sep. 15, 2020

(54) INFORMATION PROCESSING AND FORMING WITH USER SELECTION OF COLOR MATERIAL FILLING CONTAINERS AND DISPLAY OF COLOR IMAGE

(71) Applicant: FUJI XEROX CO., LTD., Tokyo (JP)

(72) Inventor: Yusuke Taguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/549,377

(22) Filed: Aug. 23, 2019

(30) Foreign Application Priority Data

Mar. 20, 2019 (JP) ................. 2019-052472

(51) Int. Cl.
*H04N 1/00* (2006.01)
*H04N 1/60* (2006.01)

(52) U.S. Cl.
CPC ......... *H04N 1/6011* (2013.01); *H04N 1/0044* (2013.01); *H04N 1/00559* (2013.01); *H04N 1/605* (2013.01); *H04N 1/6008* (2013.01)

(58) Field of Classification Search
CPC .... H04N 1/0044; H04N 1/00559; H04N 1/60; H04N 1/6002; H04N 1/6008; H04N 1/6033–605; G06K 15/1878
See application file for complete search history.

(56) References Cited

U.S. PATENT DOCUMENTS 10,084,943 B2 * 9/2018 Miyahara .................. H04N 1/56
2004/0040614 A1 * 3/2004 Sesek .................... B41J 2/17506
141/2

FOREIGN PATENT DOCUMENTS

| JP | H05-301382 A | 11/1993 |
| JP | 2010-066882 A | 3/2010 |
| JP | 2010-117648 A | 5/2010 |
| JP | 2011-140135 A | 7/2011 |

* cited by examiner

*Primary Examiner* — Scott A Rogers
(74) *Attorney, Agent, or Firm* — Oliff PLC

(57) ABSTRACT

An information processing apparatus, for use with an image forming apparatus including one or more mounting portions to which containers filled with color materials of different types respectively are mountable, includes a receiving unit that receives designation of pieces of color material information respectively indicating plural color materials selected by a user from the color materials with which the containers are to be filled respectively; an acquisition unit that acquires first image data indicating a first image; and a display unit that displays a second image using the color material information and the first image data.

10 Claims, 6 Drawing Sheets

FIG. 8

WHEN PRINTING, OPTIMIZATION OF TONER ARRANGEMENT IS NECESSARY TO EXPRESS NORMAL COLOR TONE.

CANCEL    OK

PRINTING IS TO BE PERFORMED WITH TONER CURRENTLY MOUNTED. IF TONER REPLACEMENT IS REQUIRED, PLEASE REPLACE AS FOLLOWS.

COLOR OF GOLD / K / C / M

CANCEL    OK

B06    A02    B05

INFORMATION PROCESSING AND FORMING WITH USER SELECTION OF COLOR MATERIAL FILLING CONTAINERS AND DISPLAY OF COLOR IMAGE

CROSS-REFERENCE TO RELATED APPLICATIONS

This application is based on and claims priority under 35 USC 119 from Japanese Patent Application No. 2019-052472 filed Mar. 20, 2019.

BACKGROUND

(i) Technical Field

The present disclosure relates to an information processing apparatus, an image forming apparatus, and a non-transitory computer readable medium.

(ii) Related Art

There is known an image forming apparatus that generates a preview image from print data and displays the preview image on a user interface (UI) screen. In addition, a proposed image forming apparatus includes plural mounting portions for mounting containers filled with color materials such as toner or ink used in transferring an image to a medium such as printing paper and is configured to form an image by superimposing prints of respective colors (for example, JP-A-1993-301382).

In the image forming apparatus including the plural mounting portions to which containers filled with color materials of different colors are mountable, the preview image does not reflect what color materials are actually charged into the image forming apparatus, and the actual print may differ in color from the preview image. In addition, the image forming apparatus is not configured so that the color materials to be charged can be designated on the UI screen and the preview image can be used to confirm the image that is supposed to be formed using those color materials.

SUMMARY

Aspects of non-limiting embodiments of the present disclosure relate to making it possible to confirm the image that is supposed to be formed from the acquired image data when containers filled with color materials indicated respectively by plural pieces of designated color material information are mounted to mounting portions of an image forming apparatus.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus for use with an image forming apparatus including one or more mounting portions to which containers filled with color materials of different types respectively are mountable, the information processing apparatus including: a receiving unit that receives designation of pieces of color material information respectively indicating plural color materials selected by a user from the color materials with which the containers are to be filled respectively; an acquisition unit that acquires first image data indicating a first image; and a display unit that displays a second image using the color material information and the first image data.

BRIEF DESCRIPTION OF THE DRAWINGS

Exemplary embodiments of the present invention will be described in detail based on the following figures, wherein:

FIG. 8 is a diagram illustrating an example of a confirmation screen displayed on the display unit; and FIG. 9 is a diagram illustrating an example of the confirmation screen displayed on the display unit.

DETAILED DESCRIPTION

Hereinafter, an exemplary embodiment of the present disclosure will be described with reference to the drawings.

Exemplary Embodiment

Figure 1:
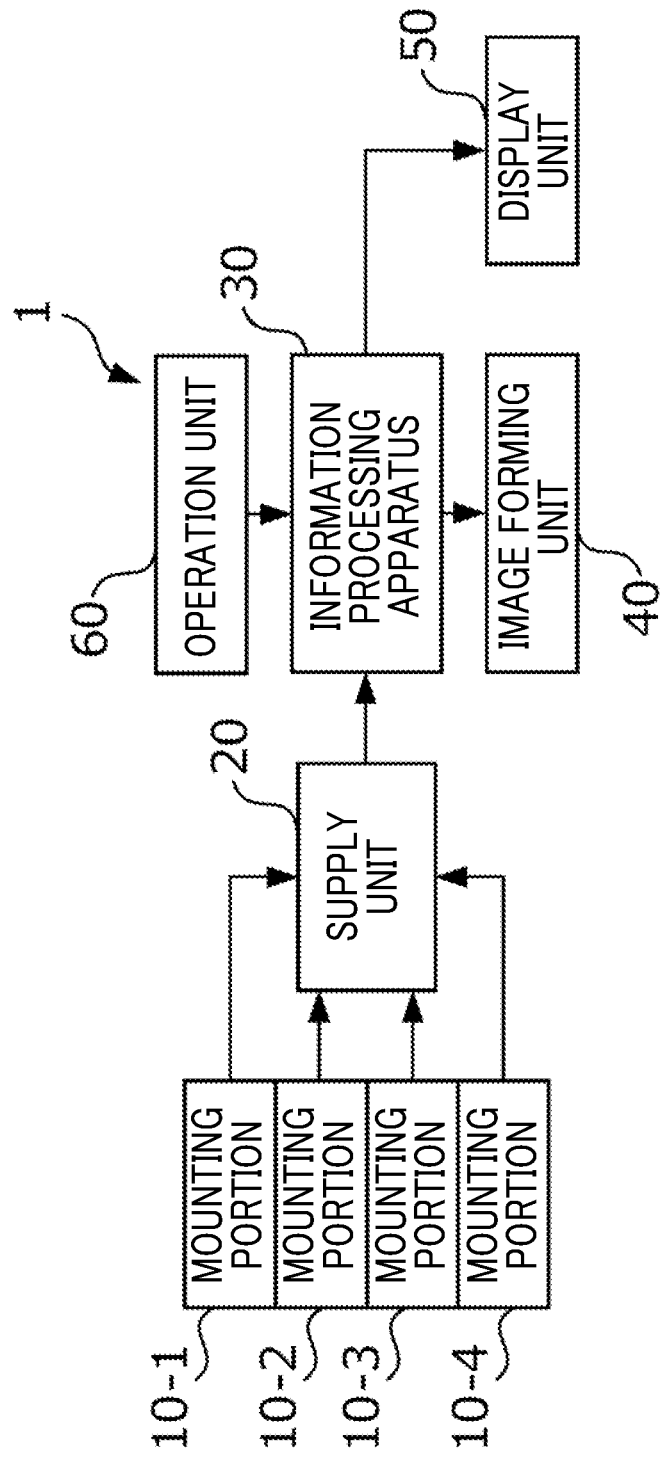
FIG. 1 is a block diagram illustrating a configuration example of an image forming apparatus according to an exemplary embodiment of the present disclosure.

FIG. 1 is a block diagram illustrating a configuration example of an image forming apparatus 1 according to an exemplary embodiment of the present disclosure. The image forming apparatus 1 according to the present exemplary embodiment is, for example, a laser printer capable of replacing five or more color toners including special colors and having a preview function. As illustrated in FIG. 1, the image forming apparatus 1 includes mounting portions 10-1 to 10-4, a supply unit 20, an information processing apparatus 30, an image forming unit 40, a display unit 50, and an operation unit 60. In addition to the components illustrated in FIG. 1, the image forming apparatus 1 may further include a communication apparatus that performs communication with an image reading apparatus such as a scanner and another apparatus via a communication network such as a local area network (LAN) or a telephone line.

In each of the mounting portions 10-1 to 10-4, a container (in the present exemplary embodiment, a toner cartridge) filled with a color material (in the present exemplary embodiment, a toner) may be mounted. In each of the mounting portions 10-1 to 10-4, a container filled with a color material having each different color is mounted. Hereinafter, in a case where there is no need to distinguish each of the mounting portions 10-1 to 10-4, the mounting portions 10-1 to 10-4 are referred to as "mounting portions 10". In the present exemplary embodiment, although an image forming apparatus including four mounting portions 10 is described, the number of the mounting portions 10 may be one or more and three or less, five or more. In short, the image forming apparatus 1 may include one or more mounting portions 10.

In an image forming apparatus in the related art in which plural color materials may be mounted, a color of the color material, with which the container mounted to the mounting portion is to be filled, is predetermined for each mounting portion. On the other hand, the image forming apparatus 1 is different from the image forming apparatus in the related art, in that the color of the color material with which the container mounted to each of the mounting portions 10-1 to 10-4 is to be filled is not determined. In the present exemplary embodiment, the container to be mounted to the mounting portion 10 is filled with a color material having one color among colors of cyan (C), magenta (M), yellow (Y), and black (K), and a special color. The special color is, for example, a color that cannot be expressed by a subtractive mixture of C, M, and Y, such as gold, silver, white, luminescent color, and the like. Further, in the container to be mounted to the mounting portion 10, a semiconductor chip, which stores in advance a color ID as an identifier indicating the color of the color material with which the container is filled, is incorporated. Although not illustrated in FIG. 1, an electrode for energizing the semiconductor chip incorporated in the container is provided in the mounting portion 10. In the present exemplary embodiment, the color ID is read via the electrode.

In the image forming apparatus 1, a transfer order of the color material, with which the container mounted to the mounting portion 10 is filled, is predetermined for each mounting portion 10. Specifically, each color material is transferred onto a medium such as printing paper such that the color material with which the container mounted to the mounting portion 10-1 is filled is firstly transferred onto the medium, the color material with which the container mounted to the mounting portion 10-2 is filled is secondly transferred onto the medium, the color material with which the container mounted to the mounting portion 10-3 is filled is thirdly transferred onto the medium, and the color material with which the container mounted to the mounting portion 10-4 is filled is lastly transferred onto the medium. Therefore, preferably, the color of the color material with which the container mounted to the mounting portion 10-1 is filled is the darkest, the color of the color material with which the container mounted to the mounting portion 10-2 is filled is the second darkest, the color of the color material with which the container mounted to the mounting portion 10-3 is filled is the third darkest, and the color of the color material with which the container mounted to the mounting portion 10-4 is filled is the brightest. The reason is that the bright color is prevented from being covered by the darker color. For example, in a case where four containers filled with color materials having different colors of C, M, Y, and K are respectively mounted to the mounting portions 10-1 to 10-4, preferably, the container filled with the color material having the color of K is mounted to the mounting portion 10-1, the container filled with the color material having the color of C is mounted to the mounting portion 10-2, the container filled with the color material having the color of M is mounted to the mounting portion 10-3, and the container filled with the color material having the color of Y is mounted to the mounting portion 10-4.

The supply unit 20 is an interface circuit that reads the color ID from the semiconductor chip, which is incorporated in the container currently mounted to the mounting portion 10, via the electrode and supplies the color ID to the information processing apparatus 30.

The information processing apparatus 30 is a computer that controls the image forming apparatus 1. The information processing apparatus 30 acquires first image data representing an image to be printed by the image forming apparatus 1 (hereinafter, referred to as a first image), and performs processing for preview display of the image. Details of the processing performed by the information processing apparatus 30 will be described later.

The image forming unit 40 includes, for example, a photosensitive body, and forms the first image on a medium such as printing paper, using color material information and the first image data, under the control of the information processing apparatus 30. The display unit 50 is, for example, a liquid crystal display. The display unit 50 displays various images under the control of the information processing apparatus 30. The operation unit 60 is, for example, a touch sensor having a transparent sheet shape that is spread on a display surface of the display unit 50, and forms a touch panel together with the display unit 50. In a case where an operation such as a touch is performed on the operation unit 60, the operation unit 60 outputs operation content data indicating the content of the operation to the information processing apparatus 30. The image forming unit 40, the display unit 50, and the operation unit 60 are not particularly different from those in the image forming apparatus in the related art, and thus the detailed description will be omitted.

Although not illustrated in FIG. 1, the information processing apparatus 30 includes, for example, a control unit such as a central processing unit (CPU), a random access memory (RAM), and a storage unit such as a hard disk drive.

The storage unit stores various programs such as an in-printer application program, system parameters, and a color material mounting order list in advance. Examples of the in-printer application program include a preview display program causing the information processing apparatus 30 to perform preview display by which a feature of the present disclosure is remarkably represented.

The system parameters include setting information related to functions of the image forming apparatus 1 such as information indicating availability of preview display, and color material information. The color material information is information indicating the color material with which the container currently mounted to each of the one or more mounting portions is filled. More specifically, the color material information is data in which an identifier of each of the mounting portions 10-1 to 10-4 is associated with the color ID of the color material with which the container currently mounted to the mounting portion 10 is filled. In the present exemplary embodiment, the transfer order of the color material mounted in the mounting portion 10 is predetermined for each mounting portion 10. Therefore, the color material information is data indicating a combination of the color materials currently mounted in the image forming apparatus 1 and indicating the transfer order of each color material.

The color material mounting order list is data indicating the color of the color material with which the container mounted to each of the mounting portions 10-1 to 10-4 is to be filled, for each combination of colors of the color materials with which the containers mounted to the mounting portions 10-1 to 10-4 are filled, in other words, data indicating a correct transfer order of the color materials having different colors for each combination of the colors. The transfer order of the color materials having different colors for each combination of the colors may be referred to as a "color material mounting order". For example, for a combination of C, M, Y, and K, the color material mounting order list indicates that the container filled with the color material having the color of K is to be mounted to the mounting portion 10-1, that the container filled with the color material having the color of C is to be mounted to the mounting portion 10-2, that the container filled with the color material having the color of M is to be mounted to the mounting portion 10-3, and that the container filled with the color material having the color of Y is to be mounted to the mounting portion 10-4. In addition, for a combination of gold, K, C, and M, the color material mounting order list indicates that the container filled with the color material having the color of gold is to be mounted to the mounting portion 10-1, that the container filled with the color material having the color of K is to be mounted to the mounting portion 10-2, that the container filled with the color material having the color of C is to be mounted to the mounting portion 10-3, and that the container filled with the color material having the color of M is to be mounted to the mounting portion 10-4.

Figure 2:
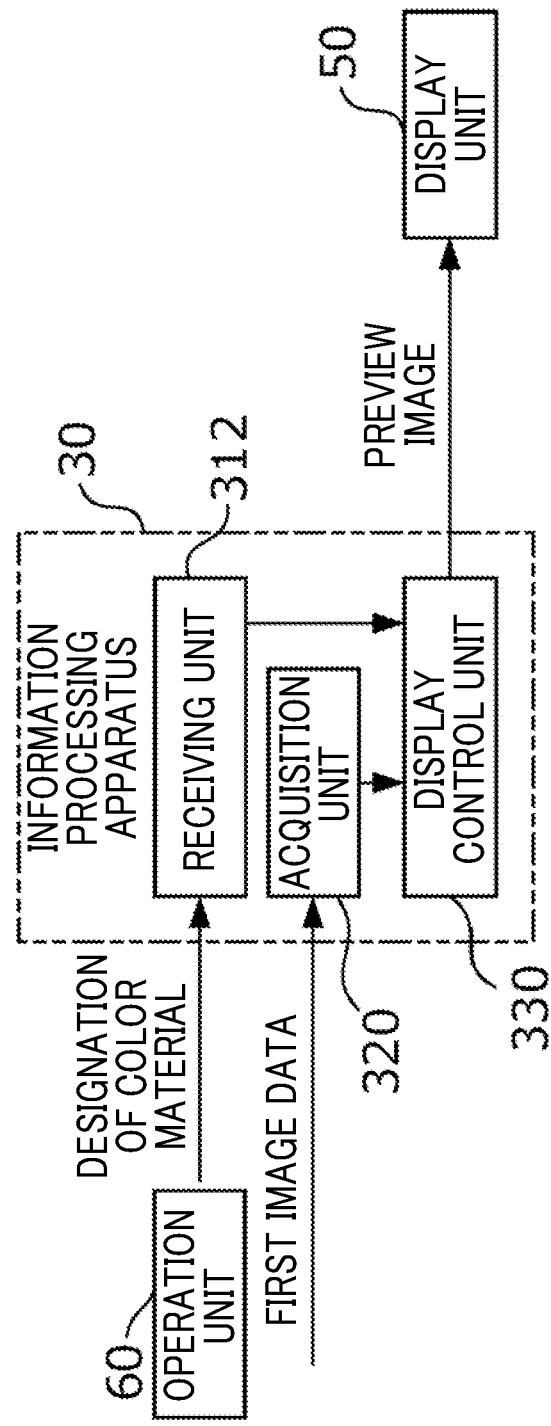
FIG. 2 is a functional block diagram illustrating a functional configuration of an information processing apparatus of the image forming apparatus.

The RAM is used as a work area in a case where a program is executed. The control unit reads the preview display program from the storage unit to the RAM and executes the preview display program in a case where power (not illustrated in FIG. 1) is applied to the image forming apparatus 1. The control unit operates according to the preview display program, and thus the information processing apparatus 30 functions as a receiving unit 312, an acquisition unit 320, and a display control unit 330 illustrated in FIG. 2. Functions of the receiving unit 312, the acquisition unit 320, and the display control unit 330 illustrated in FIG. 2 are as follows.

The receiving unit 312 receives designation of the color material information indicating each of the plural color materials selected by the user via the operation unit 60 from among the color materials with which the containers mounted to the one or more mounting portions 10 are filled respectively. More specifically, the receiving unit 312 receives designation of positions of the mounting portions 10 for each color material.

The acquisition unit 320 acquires the first image data. As a method of acquiring the first image data, a method of acquiring the first image data via an image reading apparatus, a method of acquiring the first image data by downloading the first image data via a communication apparatus, a method of acquiring the first image data by facsimile reception, or the like may be used.

The display control unit 330 executes preview display processing. The preview display processing is processing of causing the display unit 50 to display a preview image of the first image (hereinafter, referred to as a second image) using the color material information included in the system parameters and the first image data. The second image is different from the first image in that at least a scale of the second image is changed to be suitable for display on the display unit 50.

Figure 3:
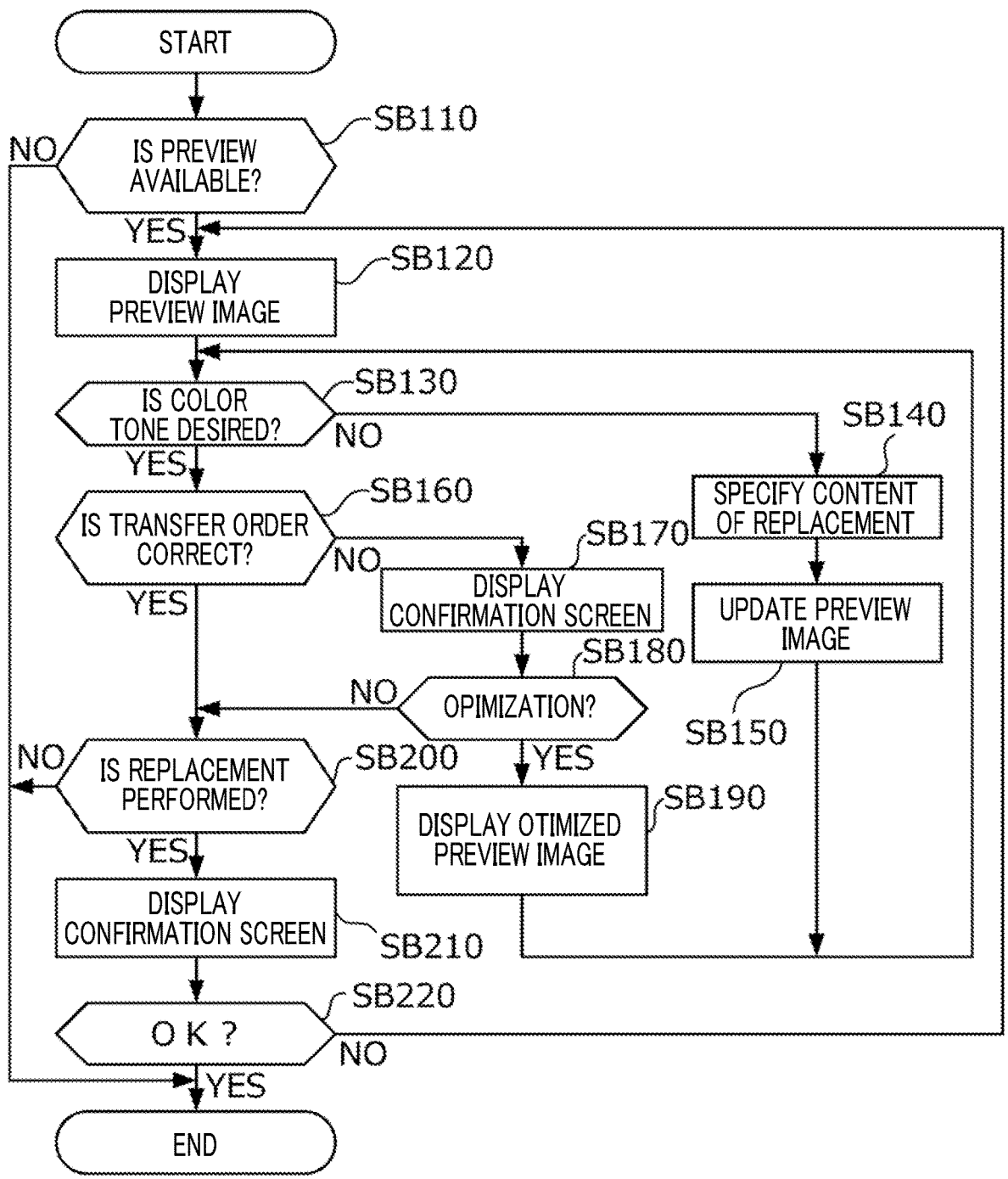
FIG. 3 is a flowchart illustrating a flow of preview display processing according to the exemplary embodiment.
Figure 4:
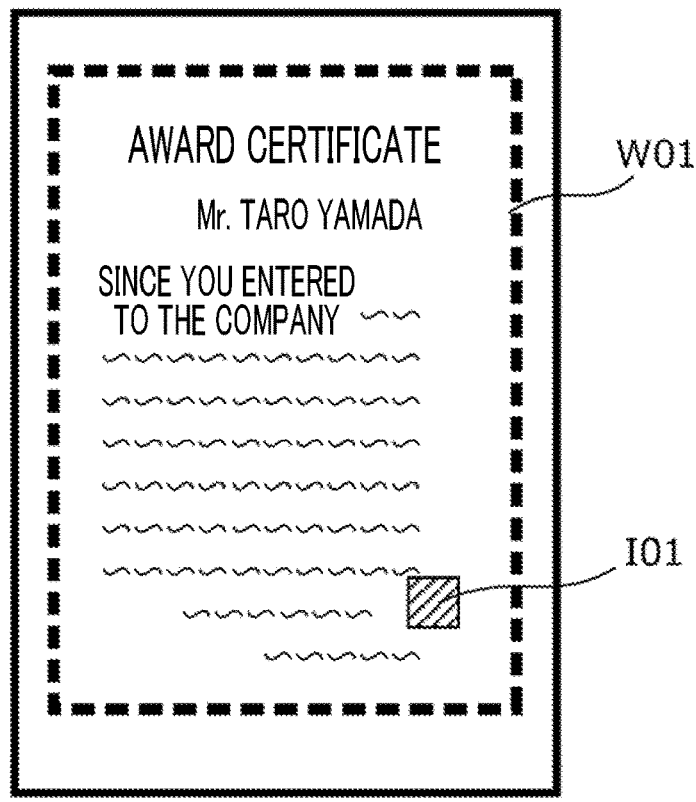
FIG. 4 is a diagram illustrating an example of a first image.

FIG. 3 is a flowchart illustrating a flow of the preview display processing performed by the display control unit 330. Hereinafter, an operation of the display control unit 330 will be described by taking an example in which, the container filled with the color material having the color of K is mounted to the mounting portion 10-1, the container filled with the color material having the color of C is mounted to the mounting portion 10-2, the container filled with the color material having the color of M is mounted to the mounting portion 10-3, and the container filled with the color material having the color of Y is mounted to the mounting portion 10-4. When the operation to be described is started, it is assumed that the color material information indicating the color (that is, K, C, M, and Y) of the color material currently mounted in each of the mounting portions 10-1 to 10-4 and the system parameter indicating availability of preview display are stored in the storage unit. Further, in the following description, it is assumed that the first image data representing the first image illustrated in FIG. 4 is acquired by the acquisition unit 320. As illustrated in FIG. 4, in the present operation example, the first image is an image of an award certificate, and the first image data includes data for respectively designating the color of K as a color of characters such as "award certificate", the color of M as a color of a seal portion I01 representing a seal of an issuer of the award certificate, and the color of gold as a color of a frame portion W01.

In the preview display processing illustrated in FIG. 3, the display control unit 330 first determines whether or not preview display is available by referring to the system parameter (step SB110). In a case where the determination result in step SB110 is "No", the display control unit 330 ends preview display processing. Thereafter, the information processing apparatus 30 causes the image forming unit 40 to print the first image. As described above, in the present operation example, since the system parameter indicating that preview display is available is stored in the storage unit, the determination result in step SB110 is "Yes".

In a case where the determination result in step SB110 is "Yes", the display control unit 330 first copies the color material information included in the system parameter, as a color material candidate information. Similarly to the color material information included in the system parameter, the color material candidate information indicates not only the combination of the colors of the color materials but also the transfer order of the color materials. Next, the display control unit 330 generates a second image from the first image data, displays a preview screen including the second image on the display unit 50, and inquires the user whether or not the second image has a desired color tone (step SB120). More specifically, the display control unit 330 generates, from the first image data, intermediate data representing a print of each color indicated by the color material candidate information. Next, the display control unit 330 generates second image data (for example, data in a JPEG format) representing the second image by performing RGB conversion on the intermediate data, and displays the second image on the preview screen according to the second image data. On the other hand, when generating the intermediate data, in a case where the first image data includes data for designating a color that cannot be expressed by the combination of the colors indicated by the color material candidate information, the display control unit 330 generates the intermediate data excluding the data for designating the corresponding color. In a case of displaying the second image, only the combination of the colors indicated by the color material candidate information may be reflected in the second image, or the transfer order of the color materials may be reflected in the second image in addition to the combination of the colors. In the present exemplary embodiment, the display control unit 330 reflects the transfer order of the color materials in displaying of the second image in addition to the combination of the colors.

Figure 5:
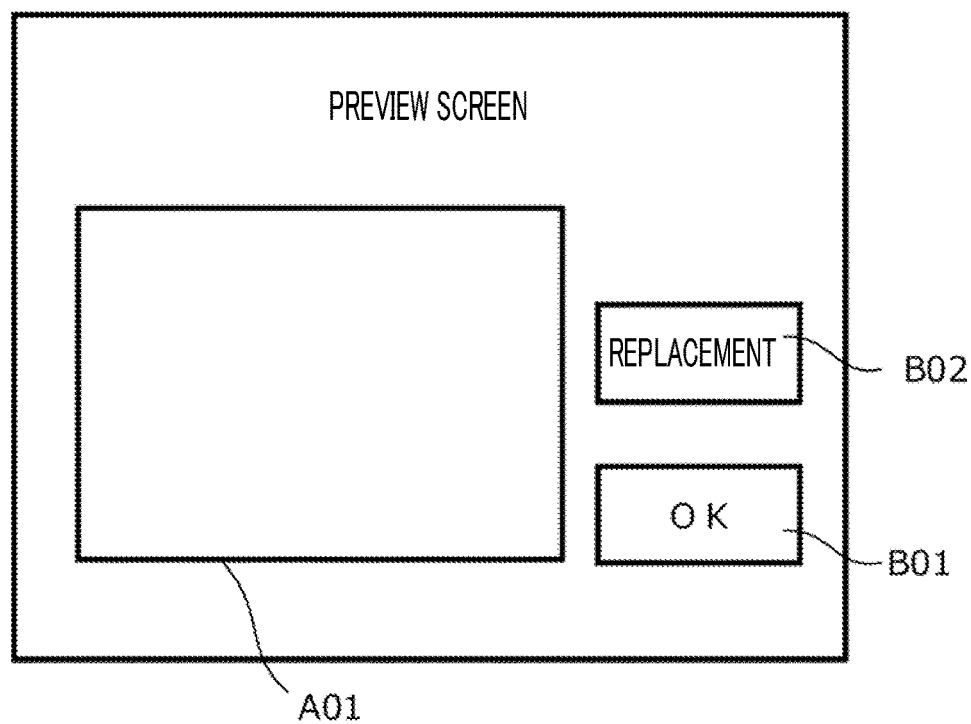
FIG. 5 is a diagram illustrating an example of a preview screen displayed on a display unit.

FIG. 5 is a diagram illustrating an example of a preview screen displayed on the display unit 50. The preview screen illustrated in FIG. 5 includes a display area A01 in which the second image is displayed, and virtual operation buttons B01 and B02. The virtual operation button B01 is for allowing the user to input that the second image has a desired color tone. The virtual operation button B02 is for allowing the user to input replacement of the color materials in a case where the second image does not have a desired color tone. As described above, in the present operation example, the first image data includes data for designating a special color (in the present operation example, a color of gold) that cannot be expressed by each color (in the present operation example, K, C, M, and Y) indicated by the color material information stored in the storage unit. Therefore, the display control unit 330 generates the intermediate data excluding the data for designating printing in a special color, and displays the second image in the display area A01. Thereby, in the present operation example, as illustrated in FIG. 6, an image of the award certificate from which the frame portion W01 is removed is displayed in the display area A01, as the second image.

The user who visually confirms the preview screen displayed on the display unit 50 determines whether or not the second image has a desired color tone, and inputs the determination result by operating the operation unit 60. Specifically, the user presses the virtual operation button B01 in a case where it is determined that the second image has a desired color tone, and presses the virtual operation button B02 in a case where it is determined that the second image does not have a desired color tone. On the other hand, the display control unit 330 determines whether or not the second image has a color tone desired by the user according to the operation content data received from the operation unit 60 (step SB130). Specifically, in a case where the operation content data indicating that the virtual operation button B01 is pressed is received from the operation unit 60, the display control unit 330 determines that the second image has a color tone desired by the user, and in a case where the operation content data indicating that the virtual operation button B02 is pressed is received from the operation unit 60, the display control unit 330 determines that the second image does not have a color tone desired by the user. In a case where the determination result in step SB130 is "No", in order to allow the user to perform a color material replacement operation, the display control unit 330 updates the display content on the display unit 50 to a preview screen illustrated in FIG. 7, and executes processing of step SB140 and step SB150. On the other hand, in a case where the determination result in step SB130 is "Yes", the display control unit 330 executes processing of step SB160.

Figure 6:
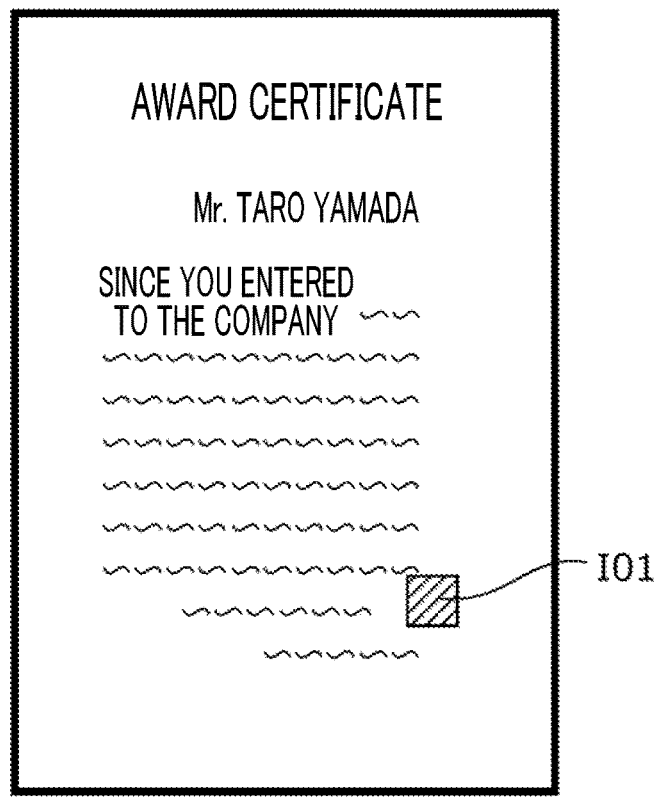
FIG. 6 is a diagram illustrating an example of a second image displayed on the preview screen.

As described above, in the present operation example, an image illustrated in FIG. 6 is displayed in the display area A01, as a preview image of the first image illustrated in FIG. 4. The user who visually confirms the image illustrated in FIG. 6 recognizes that the frame portion W01 having a color of gold is not printed, determines that the second image does not have a desired color tone, and presses the virtual operation button B02. Thus, the determination result in step SB130 is "No". Thereby, the display screen on the display unit 50 is updated to the preview screen illustrated in FIG. 7, and processing of step SB140 and processing of step SB150 are executed.

Figure 7:
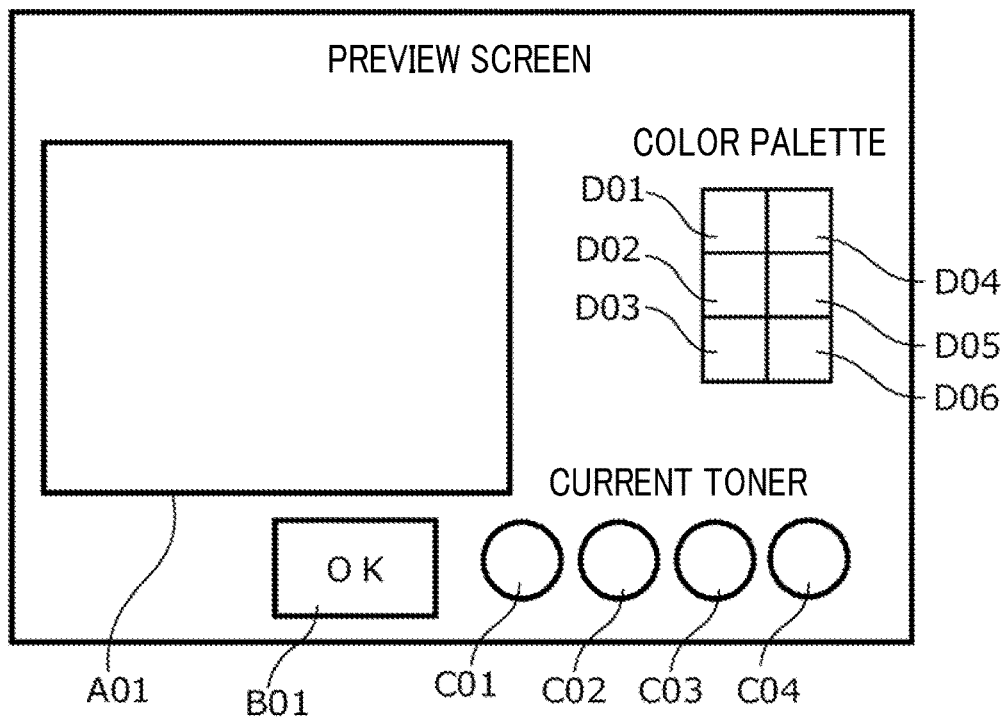
FIG. 7 is a diagram illustrating an example of the preview screen displayed on the display unit.

In the preview screen illustrated in FIG. 7, instead of the virtual operation button B02, virtual operation buttons C01, C02, C03, and C04, and virtual operation buttons D01, D02, D03, D04, D05, and D06 are provided. Each of the virtual operation buttons C01, C02, C03, and C04 is for allowing the user to designate a color material to be replaced. Each of the virtual operation buttons D01, D02, D03, D04, D05, and D06 is for allowing the user to designate a replaced color material.

The virtual operation buttons C01, C02, C03, and C04 correspond to the mounting portion 10-1, the mounting portion 10-2, the mounting portion 10-3, and the mounting portion 10-4. The virtual operation buttons C01, C02, C03, and C04 are displayed in colors indicated by the color material candidate information. In the present operation example, each of the virtual operation buttons C01, C02, C03, and C04 is displayed in each color of K, C, M, and Y. The virtual operation buttons D01, D02, D03, D04, D05, and D06 correspond to the color materials that may be mounted in the image forming apparatus 1, and are displayed in colors of the corresponding color materials. In the present operation example, the virtual operation button D01 is displayed in a color of gold, the virtual operation button D02 is displayed in a color of silver, the virtual operation button D03 is displayed in a color of K, the virtual operation button D04 is displayed in a color of C, the virtual operation button D05 is displayed in a color of M, and the virtual operation button D06 is displayed in a color of Y.

The user who visually confirms the preview screen illustrated in FIG. 7 performs a color material replacement operation on the preview screen. Hereinafter, the following operation will be described by taking an example in which an operation of replacing the color material having a color of Y with the color material having a color of gold is performed, that is, the virtual operation button C04 is pressed and then the virtual operation button D01 is pressed. The order of an operation for designating the color material to be replaced and an operation for designating the replaced color material is not limited to the above-described order. For example, the replaced color material may be firstly designated, and then the color material to be replaced may be designated.

In a case where a color material replacement operation is performed on the preview screen by the user, the display control unit 330 acquires color material information related to the replaced color material via the receiving unit 312, and updates the color material candidate information with the acquired color material information (step SB140). In the present operation example, information indicating that the color material having a color of gold is to be mounted in the mounting portion 10-4 is acquired. Therefore, the color material candidate information is updated to information indicating that, the color material of the mounting portion 10-1 is a color material having a color of K, the color material of the mounting portion 10-2 is a color material having a color of C, the color material of the mounting portion 10-3 is a color material having a color of M, and the color material of the mounting portion 10-4 is a color material having a special color (in the present operation example, a color of gold). In step SB150 subsequent to step SB140, the display control unit 330 updates the display content of the preview screen according to the color material candidate information updated in step SB140.

More specifically, the second image displayed in the display area A01 is updated to the second image (refer to FIG. 7) including the frame portion W01 as in the image illustrated in FIG. 4, and the display color of the virtual operation button C04 is updated to a color of gold. In the present operation example, since the first image data does not include data for designating a color of Y, the second image without defect is displayed in the display area A01 as compared with the image illustrated in FIG. 4. In addition, in a case of generating the intermediate data, generation of the intermediate data for each color of K, C, M, and Y and generation of the intermediate data for a special color may be performed separately or collectively. Further, in a case where the color material having a color of K is replaced with the color material having a special color, in the intermediate data, black may be expressed by process black. The process black refers to black expressed by a mixture of colors of C, M, and Y. In a case where the colors indicated by the color material candidate information updated in step SB140 includes a color that cannot be expressed by a mixed color of R, G, and B, the corresponding color may be replaced with a similar color that can be expressed by a mixed color of R, G, and B when RGB conversion is performed, and thus the second image may be displayed. For example, in a case where the special color is a color of gold, the special color may be replaced with a color of ocher, and thus the second image may be displayed.

As described above, the user who visually confirms the second image including the frame portion W01 determines that the second image has a desired color tone, and presses the virtual operation button B01. Thus, in the present operation example, the determination result in step SB130 performed again is "Yes". Thereby, processing of step SB160 and subsequent processing are performed.

In step SB160, the display control unit 330 determines whether or not the transfer order of each color material indicated by the color material candidate information is correct by referring to the color material mounting order list. More specifically, the display control unit 330 determines that the transfer order of each color material indicated by the color material candidate information is correct in a case where the transfer order of each color material indicated by the color material candidate information matches with the transfer order indicated by the color material mounting order list for a combination of each color material indicated by the color material candidate information. In a case where the determination result in step SB160 is "Yes", the display control unit 330 executes processing of step SB200. In a case where the determination result in step SB160 is "No", the display control unit 330 executes processing of step SB170.

In the present operation example, the transfer order of each color material indicated by the color material candidate information is an order of colors of K, C, and M, and a special color (in the present operation example, a color of gold), and the transfer order indicated by the color material mounting order list for the combination of the colors is an order of a special color (in the present operation example, a color of gold) and colors of K, C, and M. Therefore, the transfer order of each color material indicated by the color material candidate information does not match with the transfer order of each color material indicated by the color material mounting order list, and thus the determination result in step SB160 is "No". Thereby, processing of step SB170 is executed.

In step SB170, the display control unit 330 displays a confirmation screen illustrated in FIG. 8 on the display unit 50. The confirmation screen illustrated in FIG. 8 is a screen for prompting the user to optimize arrangement of the color materials. The display on the confirmation screen notifies the user that the mounting portions 10, to which the containers filled with the color materials are to be mounted respectively according to a predetermined combination of the color materials indicated by the color material candidate information, are different from the mounting portions 10 indicated by the designation. The confirmation screen illustrated in FIG. 8 includes a virtual operation button B03 for instructing the user to optimize arrangement of the color materials, and a virtual operation button B04 for instructing the user to cancel the optimization. The user presses the virtual operation button B03 in a case where it is desired to optimize arrangement of the color materials, and presses the virtual operation button B04 in a case where the optimization is not desired.

In step SB180 subsequent to step SB170, the display control unit 330 determines whether or not optimization is desired according to the operation content data received from the operation unit 60. In a case where the operation content data received from the operation unit 60 indicates that the virtual operation button B03 is pressed, the display control unit 330 determines that optimization is desired, and in a case where the operation content data received from the operation unit 60 indicates that the virtual operation button B04 is pressed, the display control unit 330 determines that optimization is not desired. The display control unit 330 executes processing of step SB190 in a case where the determination result in step SB180 is "Yes", and executes processing of step SB200 in a case where the determination result in step SB180 is "No". Hereinafter, in the present operation example, a case where the virtual operation button B03 is pressed by the user who visually confirms the confirmation screen illustrated in FIG. 8 will be described. Since the virtual operation button B03 is pressed, the determination result in step SB180 is "Yes", and processing of step SB190 is executed.

In step SB190, the display control unit 330 displays the preview screen in which the transfer order of the color materials is optimized, on the display unit 50. More specifically, the display control unit 330 first updates the color material candidate information to the color material information indicating the transfer order indicated by the color material mounting order list for the combination of the colors indicated by the color material candidate information. Next, the display control unit 330 updates the second image displayed in the display area A01 to an image in which the transfer order indicated by the updated color material candidate information is reflected. As a result, the second image displayed on the display unit 50 is one that is supposed to be formed in the image forming apparatus 1 when the containers filled with the color materials are mounted to the mounting portions 10 as predetermined according to the combination of the color materials indicated by the color material candidate information. Further, the display control unit 330 updates the display color of each of the virtual operation buttons C01, C02, C03, and C04 to the color indicated by the updated color material candidate information. Specifically, the display control unit 330 updates the display colors of the virtual operation buttons C01, C02, C03, and C04 to a special color (in the present operation example, a color of gold) and colors of K, C, and M. As a result, the user is notified of the mounting portions to which the containers filled with the color materials respectively are to be mounted according to the predetermined combination of the color materials indicated by the color material candidate information and also notified when the mounting portions 10, to which the containers filled with the color materials each indicated by the designation are to be mounted, are different from the mounting portions 10 to which the containers are currently mounted.

In a case where processing of step SB190 is completed, the display control unit 330 executes processing of step SB130 again. Hereinafter, an operation in a case where the virtual operation button B01 is pressed by the user who visually confirms the optimized preview screen will be described. Since the virtual operation button B01 is pressed, the determination result in step SB130 is "Yes", and thus processing of step SB160 is executed. Since the color material candidate information is updated to the color material information indicating the transfer order indicated by the color material mounting order list for the combination of the colors indicated by the color material candidate information, the determination result in step SB160 is "Yes", and thus processing of step SB200 is executed.

In step SB200, the display control unit 330 determines whether or not replacement of the color materials is performed by comparing the color material information included in the system parameter with the color material candidate information. More specifically, the display control unit 330 determines that replacement of the color materials is performed in a case where the color material information included in the system parameter does not match with the color material candidate information, and determines that replacement of the color materials is not performed in a case where the color material information included in the system parameter matches with the color material candidate information. In a case where the determination result in step SB200 is "Yes", the display control unit 330 executes processing of step SB210. In a case where the determination result in step SB200 is "No", the display control unit 330 ends preview display processing without executing processing of step SB210 and subsequent processing. In the present operation example, the color material information included in the system parameter is information indicating colors of K, C, M, and Y, and the color material candidate information is information indicating colors of gold, K, C, and M. As described above, since the color material information included in the system parameter does not match with the color material candidate information, the determination result in step SB200 is "Yes", and thus processing of step SB210 is executed.

In step SB210, the display control unit 330 displays a confirmation screen illustrated in FIG. 9 on the display unit 50. The confirmation screen illustrated in FIG. 9 is a screen for allowing the user to confirm whether or not printing is to be performed with the color materials (that is, the color materials having colors of K, C, M, and Y) currently mounted in the image forming apparatus 1. The confirmation screen illustrated in FIG. 9 includes a display area A02 and virtual operation buttons B05 and B06. In the display area A02, a character string indicating colors of the color materials (in the present operation example, a color of gold and colors of K, C, and M) indicated by the color material candidate information is displayed. By the display of the confirmation screen illustrated in FIG. 9, in a case where the combination of the color materials indicated by the color material information is different from the combination of the color materials with which the containers currently mounted to the one or more mounting portions 10 are filled, a notification to the user is performed. The virtual operation button B05 is for allowing the user to instruct printing using the color materials currently mounted in the image forming apparatus 1. The virtual operation button B06 is for allowing the user to instruct cancel of printing. The user presses the virtual operation button B01 in a case where the user desires to perform printing using the currently-mounted color materials, and presses the virtual operation button B05 in a case where the user does not desire to perform printing using the currently-mounted color materials and desires to replace the color materials and perform printing using the replaced color materials.

In step SB220 subsequent to step SB210, the display control unit 330 determines whether or not the virtual operation button B05 is pressed. In a case where the virtual operation button B05 is pressed by the user, the determination result in step SB220 is "Yes", and in a case where the virtual operation button B06 is pressed by the user, the determination result in step SB220 is "No". In a case where the determination result in step SB220 is "No", the display control unit 330 executes processing of step SB120 again. On the other hand, in a case where the determination result in step SB220 is "Yes", the display control unit 330 ends preview display processing, and causes the image forming unit 40 to form the first image.

As described above, the image forming apparatus 1 according to the present exemplary embodiment includes one or more mounting portions 10 to which containers filled with color materials of different types respectively are mounted respectively, and further includes a receiving unit 312 that receives designation of color material information indicating each of plural color materials selected by a user from among the color materials with which the containers mounted to the one or more mounting portions 10 are filled respectively, an acquisition unit 320 that acquires first image data indicating the first image as a print image, and a display control unit 330 that displays, on a display unit 50, a second image as a preview image of the first image using the color material information and the first image data. Therefore, according to the image forming apparatus 1 of the present exemplary embodiment, in a case where the containers filled with the color materials indicated by designated plural pieces of color material information are mounted to the mounting portions 10 of the image forming apparatus 1, an image to be formed using the acquired image data is displayed on the display unit 50.

Modification Example

Although the exemplary embodiment has been described, the contents of the exemplary embodiment may be modified as follows. Further, the following modification examples may be combined. <1> In the exemplary embodiment, the color materials having plural colors may be respectively mounted in the mounting portions 10-1 to 10-4. On the other hand, the color materials having the plural colors may be mounted in one to three mounting portions among the mounting portions 10-1 to 10-4. In a case of the image forming apparatus including five mounting portions 10, the color material having a transparent color such as a transparent toner may be mounted in the last mounting portion 10 (that is, the mounting portion 10 from which the color material is transferred to the top, the container mounted to the mounting portion 10 being filled with the color material), and the color materials having the plural colors may be mounted in other four mounting portions 10.

<2> In the exemplary embodiment, the color material information is data indicating a combination of the color materials currently mounted in the image forming apparatus 1 and indicating the transfer order of each color material. On the other hand, the color material information may only indicate the combination of the color materials currently mounted in the image forming apparatus 1, and data indicating the transfer order of each color may be prepared as position information (information indicating which color material with which the container is filled is mounted in which mounting portion), separately from the color material information. In this way, in a method of using the position information separately from the color material information, the receiving unit 312 may receive, for each of pieces of the color material information, designation of the mounting portion 10 to which the container filled with the color material indicated by the color material information is mounted. In addition, in a case where the transfer order of the colors is reflected in the second image, the display control unit 330 may display the second image on the display unit 50 using the position information in addition to the color material information and the first image data.

<3> In the exemplary embodiment, it is determined whether or not the transfer order of each color material designated by the user is correct (step SB160 in FIG. 3) in a case where an operation indicating that the second image has a desired color tone is input. On the other hand, the exemplary embodiment may be modified such that the display control unit 330 skips processing of each of step SB160, step SB170, step SB180, and step SB190 and executes processing of step SB200 and subsequent processing in a case where the determination result in step SB130 is "Yes". Even when processing of each of step SB160, step SB170, step SB180, and step SB190 is skipped, in a case where the containers filled with the color materials indicated by the plural pieces of color material information are mounted to the mounting portions 10 of the image forming apparatus 1, an image to be formed using the acquired image data is displayed on the display unit 50. Similarly, processing of each of step SB200, step SB210, and step SB220 may be skipped. In a case where processing of each of step SB160, step SB170, step SB180, step SB190, step SB200, step SB210, and step SB220 is skipped, the receiving unit 312 may receive only designation of the combination of the color materials, and does not have to receive designation of the mounting position for each color material. Further, in this case, the display control unit 330 may display the second image in which only the designated combination of the color materials is reflected, on the display unit 50.

<4> When the containers are mounted to the mounting portions 10 and the color material information of the system parameter is updated, the transfer order of each color indicated by the color material information is compared with the transfer order indicated by the color material mounting order list for the combination of the colors indicated by the color material information. In a case where the mounting portions 10 to which the plural containers filled with the color materials of different types respectively are to be mounted respectively are different from the mounting portions 10 which are currently mounted, a notification to the user may be performed.

<5> In the exemplary embodiment, an example in which the present disclosure is applied to a laser printer is described. On the other hand, the present disclosure may be applied to an ink jet printer. In a case of the ink jet printer, the color material is an ink having each of colors of K, C, M, and Y, and the container filled with the color material is an ink tank.

<6> In the exemplary embodiment, the receiving unit 312 and the acquisition unit 320 are software modules. On the other hand, the receiving unit 312 and the acquisition unit 320 may be hardware modules such as an ASIC. Further, in the exemplary embodiment, the display control unit 330 that controls the display unit 50 is provided separately from the display unit 50. On the other hand, the display control unit 330 and the display unit 50 may be integrated as one body, and function as a display unit that displays the second image using the color material information and the first image data. In addition, the information processing apparatus, which includes a combination of the receiving unit 312, the acquisition unit 320, and the display unit that displays the second image using the color material information and the first image data, may be manufactured or sold alone. In short, in the image forming apparatus including one or more mounting portions to which the containers filled with the color materials of different types respectively are mounted respectively, an information processing apparatus may be provided, the information processing apparatus including a receiving unit that receives designation of color material information indicating each of plural color materials selected by a user from among the color materials with which the containers are filled respectively, an acquisition unit that acquires first image data indicating a first image, and a display unit that displays a second image using the color material information and the first image data.

<7> In the exemplary embodiment, a program causing the information processing apparatus 30 to function as the receiving unit 312, the acquisition unit 320, and the display control unit 330 is stored in advance in the storage unit of the information processing apparatus 30. On the other hand, a program causing a computer for controlling the image forming apparatus to function as the receiving unit 312, the acquisition unit 320, and the display control unit 330 may be manufactured or sold alone, the image forming apparatus including the display unit and one or more mounting portions to which the containers filled with the color materials of different types respectively are mounted respectively. In addition, as a specific example of a method of distributing the program, a method of distributing the program written in a computer readable recording medium such as a flash ROM, a method of distributing the program by downloading via a telecommunication line such as the Internet, or the like may be used. Further, in the exemplary embodiment, the program is an in-printer application program. On the other hand, the program may be a printer driver for a personal computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for use with an image forming apparatus including one or more mounting portions to which containers filled with color materials of different types respectively are mountable, the information processing apparatus comprising:
   a receiving unit that receives designation of pieces of color material information respectively indicating a plurality of color materials selected by a user from the color materials with which the containers are to be filled respectively;
   an acquisition unit that acquires first image data indicating a first image; and
   a display unit that displays a second image using the color material information and the first image data.

2. The information processing apparatus according to claim 1, wherein
   the receiving unit receives, for each of the pieces of color material information, designation of each of the mounting portions to which the container filled with the color material indicated by the color material information is to be mounted.

3. The information processing apparatus according to claim 2, which notifies the user when the mounting portions, to which the containers filled with the color materials are to be mounted according to a predetermined combination of the color materials each indicated by the pieces of color material information are different from the mounting portions indicated by the designation.

4. The information processing apparatus according to claim 2, wherein
the receiving unit receives, for each of the pieces of color material information, designation of position information indicating a position of the mounting portion, and
the display unit displays the second image using the color material information, the first image data, and the position information.

5. The information processing apparatus according to claim 1, wherein
the display unit displays the second image formed in the image forming apparatus when the containers filled with the color materials are mounted to the mounting portions as predetermined according to a combination of the color materials each indicated by the pieces of color material information.

6. The information processing apparatus according to claim 1, wherein
the user is notified of the mounting portions to which the containers filled with the color materials are to be mounted according to a predetermined combination of the color materials each indicated by the pieces of color material information.

7. The information processing apparatus according to claim 1, which notifies the user when a combination of the color materials each indicated by the pieces of color material information is different from a combination of the color materials with which the containers currently mounted to the one or more mounting portions are filled respectively.

8. The information processing apparatus according to claim 2, which notifies the user when the mounting portions to which the containers filled with the color materials indicated by the designation are to be mounted are different from the mounting portions to which the containers are currently mounted.

9. An image forming apparatus comprising:
the information processing apparatus according to claim 1; and
an image forming unit that forms the first image on a medium using the first image data acquired by the information processing apparatus.

10. A non-transitory computer readable medium storing a program causing a computer to execute an information processing process for controlling an image forming apparatus having one or more mounting portions to which containers filled with color materials of different types respectively are mountable, the process comprising:
receiving designation of pieces of color material information respectively indicating a plurality of color materials selected by a user from the color materials with which the containers are to be filled respectively;
acquiring first image data indicating a first image; and
causing a display unit to display a second image using the color material information and the first image data.

* * * * *